United States Patent
Ji et al.

(10) Patent No.: US 9,585,023 B2
(45) Date of Patent: Feb. 28, 2017

(54) LAYERED REUSE FOR A WIRELESS COMMUNICATION SYSTEM

(75) Inventors: Tingfang Ji, San Diego, CA (US);
Avneesh Agrawal, San Diego, CA (US); Gavin Horn, La Jolla, CA (US); Edward Harrison Teague, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 376 days.

(21) Appl. No.: 10/858,870

(22) Filed: Jun. 1, 2004

(65) Prior Publication Data

US 2005/0096061 A1    May 5, 2005

Related U.S. Application Data

(60) Provisional application No. 60/516,557, filed on Oct. 30, 2003.

(51) Int. Cl.
*H04W 16/02* (2009.01)
*H04W 16/12* (2009.01)
(Continued)

(52) U.S. Cl.
CPC .......... *H04W 16/02* (2013.01); *H04W 16/12* (2013.01); *H04W 72/048* (2013.01); *H04W 72/085* (2013.01)

(58) Field of Classification Search
CPC . H04W 16/02; H04W 72/048; H04W 72/085; H04W 16/12
(Continued)

(56) References Cited

U.S. PATENT DOCUMENTS

| | | |
|---|---|---|
| 4,639,914 A | 1/1987 | Winters |
| 5,038,399 A | 8/1991 | Bruckert |

(Continued)

FOREIGN PATENT DOCUMENTS

| | | |
|---|---|---|
| EP | 0658014 | 6/1995 |
| EP | 1178641 A1 | 6/2002 |

(Continued)

OTHER PUBLICATIONS

Office Action dated Jul. 31, 2006 for U.S. Appl. No. 10/871,084.
(Continued)

*Primary Examiner* — Marcos Torres

(57) ABSTRACT

To reduce inter-sector interference for "weak" users and combat a potentially large variation in interference levels observed by "strong" and weak users, system resources (e.g., frequency subbands) available for data transmission in a system are partitioned into multiple (e.g., three) disjoint sets. Each sector in the system is assigned one subband set. Neighboring sectors are assigned different subband sets such that the subband set assigned to each sector is orthogonal to the subband sets assigned to neighboring sectors. Each sector has an assigned subband set and an unassigned subband set, which contains all subbands not in the assigned set. Weak users in each sector (which are typically strong interferers to neighboring sectors) are allocated subbands in the assigned set. Strong users in each sector are allocated subbands in the unassigned set. The weak users in each sector are then orthogonal to strong interferers in neighboring sectors.

44 Claims, 9 Drawing Sheets

(51) Int. Cl.
*H04W 72/04* (2009.01)
*H04W 72/08* (2009.01)

(58) Field of Classification Search
USPC .................. 370/328, 330; 455/446–453
See application file for complete search history.

(56) References Cited

U.S. PATENT DOCUMENTS

| | | | |
|---|---|---|---|
| 5,210,771 A | 5/1993 | Schaeffer et al. ............... 375/1 |
| 5,243,598 A | 9/1993 | Lee | |
| 5,355,522 A | 10/1994 | Demange | |
| 5,497,505 A | 3/1996 | Koohogili et al. | |
| 5,515,378 A | 5/1996 | Roy, III | |
| 5,649,292 A | 7/1997 | Doner et al. | |
| 5,726,978 A | 3/1998 | Frodigh et al. | |
| 5,839,074 A | 11/1998 | Plehn et al. | |
| 5,850,605 A | 12/1998 | Souissi et al. | |
| 5,852,780 A | 12/1998 | Wang et al. | |
| 5,884,145 A | 3/1999 | Haartsen | |
| 5,937,002 A | 8/1999 | Andersson et al. .......... 375/202 |
| 5,937,003 A | 8/1999 | Sutterlin et al. | |
| 5,995,840 A | 11/1999 | Dorenbosch et al. | |
| 6,035,000 A | 3/2000 | Bingham | |
| 6,055,432 A | 4/2000 | Haleem et al. | |
| 6,067,290 A | 5/2000 | Paulraj et al. | |
| 6,069,885 A | 5/2000 | Fong et al. | |
| 6,088,416 A | 7/2000 | Perahia et al. | |
| 6,112,074 A | 8/2000 | Pinder | |
| 6,112,094 A * | 8/2000 | Dent ........................ 455/452.1 |
| 6,223,041 B1 | 4/2001 | Egner et al. | |
| 6,356,531 B1 | 3/2002 | Soliman et al. | |
| 6,385,457 B1 * | 5/2002 | Dam et al. .................. 455/456.2 |
| 6,400,697 B1 | 6/2002 | Leung et al. | |
| 6,493,331 B1 | 12/2002 | Walton ...................... H04Q 7/28 |
| 6,512,752 B1 | 1/2003 | H'mimy et al. | |
| 6,522,885 B1 | 2/2003 | Tang et al. | |
| 6,549,784 B1 * | 4/2003 | Kostic et al. ................. 455/501 |
| 6,553,234 B1 | 4/2003 | Florea | |
| 6,591,106 B1 * | 7/2003 | Zirwas ........................... 455/450 |
| 6,606,496 B1 | 8/2003 | Salvarani et al. | |
| 6,643,277 B2 | 11/2003 | Garrison et al. | |
| 6,700,882 B1 | 3/2004 | Lindoff et al. | |
| 6,704,572 B1 | 3/2004 | Whinnett et al. | |
| 6,744,743 B2 | 6/2004 | Walton et al. | |
| 6,771,599 B1 | 8/2004 | Aoyama et al. | |
| 6,807,426 B2 | 10/2004 | Pankaj | |
| 6,832,080 B1 | 12/2004 | Arslan et al. | |
| 6,870,808 B1 * | 3/2005 | Liu et al. ....................... 370/203 |
| 6,871,073 B1 | 3/2005 | Boyer et al. | |
| 6,914,876 B2 | 7/2005 | Rotstein et al. | |
| 6,917,580 B2 | 7/2005 | Wang et al. | |
| 6,934,340 B1 | 8/2005 | Dollard | |
| 6,947,748 B2 | 9/2005 | Li et al. | |
| 6,990,348 B1 | 1/2006 | Benveniste et al. | |
| 6,993,002 B2 | 1/2006 | Pan | |
| 6,993,006 B2 | 1/2006 | Pankaj | |
| 6,993,339 B2 | 1/2006 | Skillermark et al. | |
| 6,996,056 B2 | 2/2006 | Chheda et al. | |
| 7,006,466 B2 | 2/2006 | Borst et al. | |
| 7,042,856 B2 | 5/2006 | Walton et al. | |
| 7,046,654 B2 | 5/2006 | Chen | |
| 7,054,308 B1 | 5/2006 | Conway et al. | |
| 7,062,276 B2 * | 6/2006 | Xu et al. ......................... 455/450 |
| 7,076,637 B2 | 7/2006 | Kelley | |
| 7,099,678 B2 | 8/2006 | Vaidyanathan et al. | |
| 7,133,680 B2 | 11/2006 | Crisan et al. | |
| 7,146,172 B2 | 12/2006 | Li | |
| 7,151,755 B2 | 12/2006 | Xu et al. | |
| 7,151,756 B1 | 12/2006 | Park et al. | |
| 7,197,316 B2 | 3/2007 | Karger | |
| 7,209,712 B2 | 4/2007 | Holtzman | |
| 7,221,653 B2 | 5/2007 | Vanghi | |
| 7,230,942 B2 | 6/2007 | Laroia et al. | |
| 7,242,958 B2 | 7/2007 | Chung et al. | |
| 7,257,410 B2 | 8/2007 | Chun et al. | |
| 7,260,077 B2 | 8/2007 | Wu et al. | |
| 7,272,110 B2 | 9/2007 | Lee et al. | |
| 7,295,513 B2 | 11/2007 | Elliott et al. | |
| 7,321,772 B2 | 1/2008 | Morimoto et al. | |
| 7,352,819 B2 | 4/2008 | Lakshmipathi et al. | |
| 7,366,202 B2 | 4/2008 | Scherzer et al. | |
| 7,392,054 B2 | 6/2008 | Cho et al. | |
| 7,437,182 B2 | 10/2008 | Lee et al. | |
| 7,548,752 B2 | 6/2009 | Sampath et al. | |
| 7,603,127 B2 | 10/2009 | Chung et al. | |
| 8,032,145 B2 | 10/2011 | Ji | |
| 2002/0061007 A1 | 5/2002 | Pankaj et al. | |
| 2002/0119781 A1 | 8/2002 | Li et al. | |
| 2002/0147017 A1 | 10/2002 | Li et al. | |
| 2002/0159405 A1 | 10/2002 | Garrison et al. | |
| 2002/0197999 A1 | 12/2002 | Wu et al. | |
| 2003/0050067 A1 | 3/2003 | Rozmaryn | |
| 2003/0096618 A1 * | 5/2003 | Palenius .................... 455/453 |
| 2003/0123425 A1 | 7/2003 | Walton et al. | |
| 2003/0125040 A1 | 7/2003 | Walton et al. | |
| 2003/0134639 A1 | 7/2003 | Karger | |
| 2003/0176192 A1 | 9/2003 | Morimoto et al. | |
| 2003/0227889 A1 | 12/2003 | Wu et al. | |
| 2004/0081121 A1 | 4/2004 | Xu et al. | |
| 2004/0114621 A1 | 6/2004 | Rotstein et al. | |
| 2004/0209579 A1 | 10/2004 | Vaidyanathan et al. | |
| 2004/0209619 A1 | 10/2004 | Crisan et al. | |
| 2005/0048979 A1 * | 3/2005 | Chun et al. ................... 455/443 |
| 2005/0058097 A1 | 3/2005 | Kang et al. | |
| 2005/0063389 A1 | 3/2005 | Elliott et al. | |
| 2005/0096061 A1 | 5/2005 | Ji et al. | |
| 2005/0096062 A1 | 5/2005 | Ji et al. | |
| 2005/0122999 A1 | 6/2005 | Scherzer et al. | |
| 2005/0141624 A1 | 6/2005 | Lakshmipathi et al. | |
| 2005/0181833 A1 | 8/2005 | Lee et al. | |
| 2005/0237971 A1 | 10/2005 | Skraparlis et al. | |
| 2005/0282550 A1 * | 12/2005 | Cho et al. ..................... 455/447 |
| 2006/0002360 A1 | 1/2006 | Ji et al. | |
| 2006/0003794 A1 | 1/2006 | Chung et al. | |
| 2006/0019701 A1 | 1/2006 | Ji | |
| 2006/0023745 A1 | 2/2006 | Koo et al. | |
| 2006/0034173 A1 | 2/2006 | Teague et al. | |
| 2006/0120478 A1 | 6/2006 | Kim et al. | |
| 2006/0164993 A1 | 7/2006 | Teague et al. | |
| 2006/0188044 A1 | 8/2006 | Wang et al. | |
| 2007/0004419 A1 | 1/2007 | Ji et al. | |
| 2008/0253319 A1 | 10/2008 | Ji et al. | |
| 2010/0002597 A1 | 1/2010 | Sampath et al. | |
| 2011/0282999 A1 | 11/2011 | Teague et al. | |

FOREIGN PATENT DOCUMENTS

| | | |
|---|---|---|
| EP | 1473886 A2 | 11/2004 |
| GB | 2313742 | 3/1997 |
| JP | 5316039 A | 11/1993 |
| JP | 08009455 | 1/1996 |
| JP | 8186861 A | 7/1996 |
| JP | 10117373 A | 5/1998 |
| JP | 11155172 A | 6/1999 |
| JP | 2000078651 A | 3/2000 |
| JP | 2003-018091 | 1/2003 |
| JP | 2003018081 A | 1/2003 |
| JP | 2003153335 A | 5/2003 |
| JP | 2003304574 | 10/2003 |
| JP | 2003530009 | 10/2003 |
| JP | 06-204938 | 7/2004 |
| JP | 2004208234 A | 7/2004 |
| JP | 2004254204 A | 9/2004 |
| JP | 2004533750 | 11/2004 |
| JP | 2005505954 A | 2/2005 |
| JP | 2006500833 A | 1/2006 |
| JP | 2007510385 A | 4/2007 |
| JP | 4664378 B2 | 4/2011 |
| WO | 9602979 | 2/1996 |
| WO | WO9607288 A1 | 3/1996 |
| WO | 9701256 | 1/1997 |
| WO | 9746038 | 12/1997 |
| WO | 9746044 | 12/1997 |
| WO | 9749258 | 12/1997 |

(56) References Cited

FOREIGN PATENT DOCUMENTS

| WO | 0059251 | 10/2000 |
| --- | --- | --- |
| WO | 0150807 A1 | 7/2001 |
| WO | 0176098 | 10/2001 |
| WO | WO0233648 A1 | 4/2002 |
| WO | WO0233848 | 4/2002 |
| WO | 0249385 | 6/2002 |
| WO | WO02060091 | 8/2002 |
| WO | WO03005674 A1 | 1/2003 |
| WO | 03052964 | 6/2003 |
| WO | WO2005043948 A2 | 5/2005 |
| WO | 2005088872 A1 | 9/2005 |
| WO | 2005125263 | 12/2005 |

OTHER PUBLICATIONS

International Search Report—PCT/US04/04881—Internatioriai Search Report. European Patent Office. Feb. 17, 2005.
Written Opinion, PCT/US2004/034881—International Search Authority—Europeant Patent Office—Feb. 17, 2005.
International Preliminary Report on Patentability, PCT/US2004/034881—European Patent Office—Sep. 16, 2005.
Zhang et al., "Enhanced feedback method for enhanced fast-feedback channels", IEEE 802.16 Broadband Wireless Access Working Group, (Online) pp. 1-9 (Nov. 15, 2004).
"M.M. Matalgah, et al., Throughput and Spectral Efficiency Analysis 3G FDD WCDMA Cellular Systems, Dec. 1-5, 2003. IEEE Globecom, 03, vol. 6, pp. 3423-3426".
Taiwan Search Report—TW093132833—TIPO—Apr. 20, 2011.
Taiwan Search Report—TW093133004—TIPO—May 26, 2011.
Bender, P. at al., "CDMA/HDR: A Bandwidth-Efficient Nigh-speed Wireless Data Service for Nomadic Users" IEEE Communications Magazine, IEEE Service Center, Piscataway, US, vol. 38, No. 7, Jul. 1, 2000 (Jul. 1, 2000 ) , pp. 70-77, XP011091318.
Office Action issued in related U.S. Appl. No. 10/858,870 mailed Apr. 2, 2007.
Office Action issued in related U.S. Appl. No. 10/858,870 mailed Sep. 27, 2007.
European Search Report—EP12162763—Search Authority—Munich—Jun. 6, 2012.
3GPP2 C.S0024 ver. 4.0, "CDMA2000 High Rate Packet Data Air Interface Specification." IS856, Oct. 25, 2002, pp. 1-548.
Taiwan Search Report—TW100145205—TIPO—Jul. 18, 2014.
TIA/EIA: "Upper Layer (Layer 3) Signaling Standard for cdma2000 Spread Spectrum Systems Release C" TIA EIA Interim Standard, TIA/EIA/IS-2000.5-C, May 2002 (3GPP2 C.S0005-C Version 1.0, May 28, 2002).

\* cited by examiner

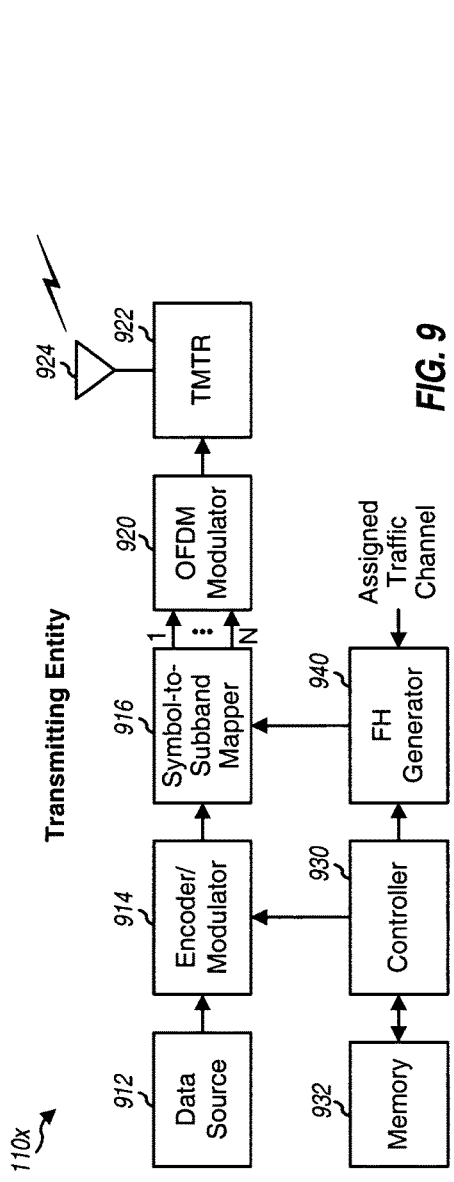
FIG. 9
FIG. 10
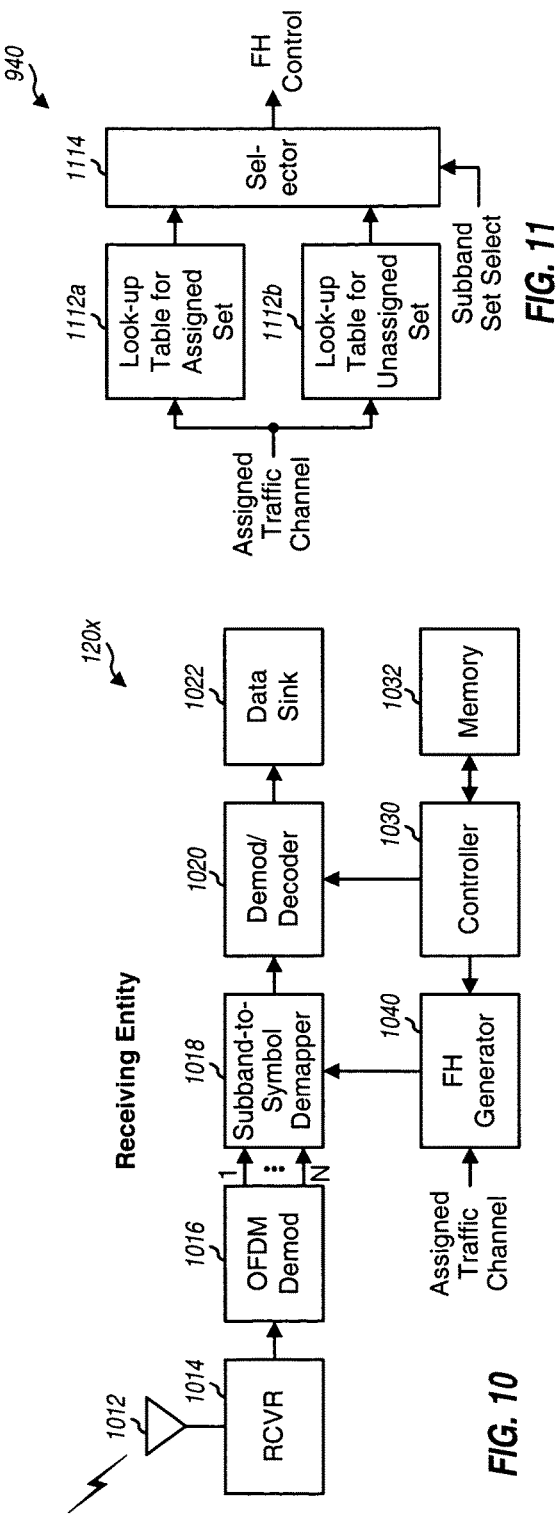
FIG. 11

LAYERED REUSE FOR A WIRELESS COMMUNICATION SYSTEM

CLAIM OF PRIORITY UNDER 35 U.S.C. §119

The present Application for Patent claims priority to Provisional Application No. 60/516,557 entitled "Layered Reuse For A Wireless Communication System" filed Oct. 30, 2003, and assigned to the assignee hereof and hereby expressly incorporated by reference herein.

BACKGROUND

I. Field

The present invention relates generally to communication, and more specifically to data transmission in a wireless multiple-access communication system.

II. Background

A wireless multiple-access system can concurrently support communication for multiple wireless terminals on the forward and reverse links. The forward link (or downlink) refers to the communication link from base stations to terminals, and the reverse link (or uplink) refers to the communication link from terminals to base stations. Multiple terminals may simultaneously transmit data on the reverse link and/or receive data on the forward link. This may be achieved by multiplexing the data transmissions on each link to be orthogonal to one another. Depending on how the multiplexing is performed, orthogonality may be achieved in time, frequency, and/or code domain. The orthogonality ensures that the data transmission for each terminal does not interfere with the data transmissions for other terminals.

A multiple-access system typically has many cells, where the term "cell" can refer to a base station and/or its coverage area depending on the context in which the term is used. Data transmissions for terminals in the same cell may be sent using orthogonal multiplexing to avoid "intra-cell" interference. However, data transmissions for terminals in different cells may not be orthogonalized, in which case each terminal would observe "inter-cell" interference from other cells. The inter-cell interference may significantly degrade performance for certain disadvantaged terminals observing high levels of interference.

To combat inter-cell interference, a wireless system may employ a frequency reuse scheme whereby not all frequency bands available in the system are used in each cell. For example, a system may employ a 7-cell reuse pattern and a reuse factor of K=7. For this system, the overall system bandwidth W is divided into seven equal frequency bands, and each cell in a 7-cell cluster is assigned one of the seven frequency bands. Each cell uses only one frequency band, and every seventh cell reuses the same frequency band. With this frequency reuse scheme, the same frequency band is only reused in cells that are not adjacent to each other, and the inter-cell interference observed in each cell is reduced relative to the case in which all cells use the same frequency band. However, a reuse factor greater than one represents inefficient use of the available system resources since each cell is able to use only a fraction of the overall system bandwidth.

There is therefore a need in the art for techniques to reduce inter-cell interference in a more efficient manner.

SUMMARY

Techniques to efficiently reduce inter-sector interference for "weak" users and to combat a potentially large variation in interference levels observed by "strong" and weak users are described herein. A weak user has a relatively poor signal quality metric for its serving base station, and a strong user has a relatively good signal quality metric for its serving base station. Signal quality metric may be defined as described below. These techniques are called "layered reuse" techniques and can efficiently utilize the available system resources (e.g., the overall system bandwidth). These techniques may be used for various communication systems and for both the forward and reverse links.

In an embodiment, the system resources (e.g., frequency subbands) available for data transmission in the system are partitioned into multiple (e.g., three) disjoint or non-overlapping sets. For a system in which each cell is partitioned into multiple (e.g., three) sectors, each sector is assigned one set of subbands. Neighboring sectors are assigned different sets of subbands such that the subband set assigned to each sector is orthogonal to the subband sets assigned to neighboring sectors. Each sector may be associated with an assigned subband set and an unassigned subband set, which may include all subbands available in the system and not included in the assigned set. The size of all subband sets may be equal, or roughly equal if the number of subbands is not an integer multiple of the number of subband sets. Alternatively, the size of the subband sets may be unequal and may be determined based on, e.g., the sector layouts, terrain, contents of the sector, and so on.

Weak users in each sector (which are also typically strong interferers to neighboring sectors) may be allocated subbands in the assigned set. Strong users in each sector (which are also typically not strong interferers to neighboring sectors) may be allocated subbands in the unassigned set. Because the assigned subband sets for neighboring sectors are orthogonal to one another, the weak users in each sector are orthogonal to the strong interferers in neighboring sectors. The layered reuse techniques effectively allocate more interference to strong users and less interference to weak users. This then "equalizes" the channel conditions for the weak and strong users, improves performance for weak users, and provides other benefits.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein:

FIG. 9 shows a block diagram of a transmitting entity;

FIG. 10 shows a block diagram of a receiving entity; and

FIG. 11 shows a block diagram of a frequency hopping generator.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

Figure 1:
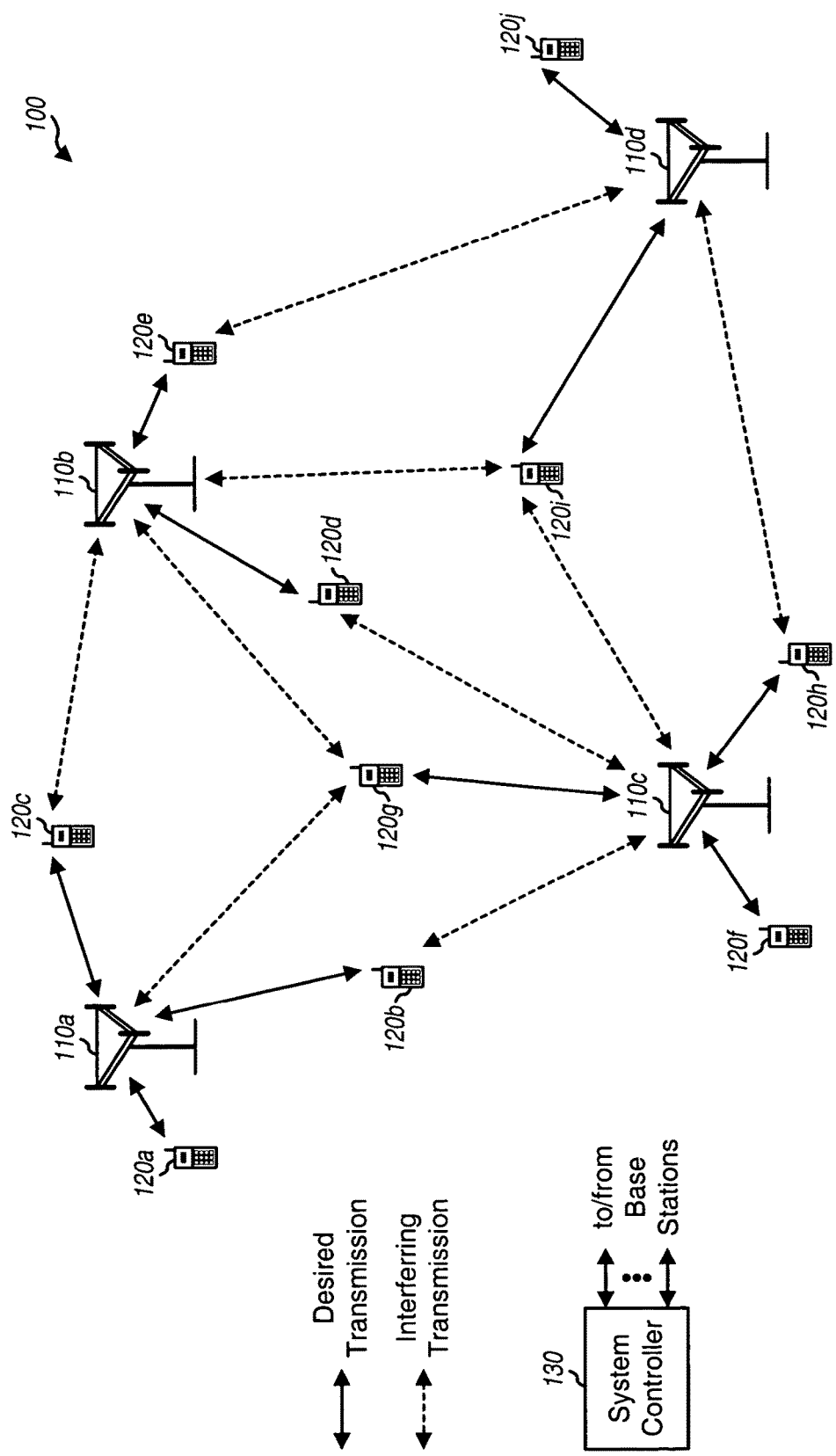
FIG. 1 shows a wireless multiple-access communication system.

FIG. 1 shows a wireless multiple-access communication system 100. System 100 includes a number of base stations 110 that support communication for a number of wireless terminals 120. A base station is a fixed station used for communicating with the terminals and may also be referred to as an access point, a Node B, or some other terminology. Terminals 120 are typically dispersed throughout the system, and each terminal may be fixed or mobile. A terminal may also be referred to as a mobile station, a user equipment (UE), a wireless communication device, or some other terminology. Each terminal may communicate with one or possibly multiple base stations on the forward and reverse links at any given moment.

For a centralized architecture, a system controller 130 couples to the base stations, provides coordination and control for these base stations, and further controls the routing of data for the terminals served by these base stations. For a distributed architecture, the base stations may communicate with one another as needed, e.g., to serve a terminal in communication with a base station, to coordinate the usage of subbands, and so on.

Each base station 110 provides communication coverage for a respective geographic area. To increase capacity, the coverage area of each base station may be partitioned into multiple (e.g., three) sectors. Each sector is served by a base transceiver subsystem (BTS). For a sectorized cell, the base station for that cell typically includes the BTSs for all sectors of that cell. For simplicity, in the following description, the term "base station" is used generically for both a fixed station that serves a cell and a fixed station that serves a sector. A "serving" base station is one with which a terminal communicates. The terms "terminal" and "user" are also used interchangeably herein.

The layered reuse techniques described herein may be used for various communication systems. For example, these techniques may be used for a Time Division Multiple Access (TDMA) system, a Frequency Division Multiple Access (FDMA) system, a Code Division Multiple Access (CDMA) system, a multi-carrier CDMA system, an Orthogonal Frequency Division Multiple Access (OFDMA) system, and so on. A TDMA system uses time division multiplexing (TDM), and transmissions for different users are orthogonalized by transmitting in different time intervals. An FDMA system uses frequency division multiplexing (FDM), and transmissions for different users are orthogonalized by transmitting in different frequency channels or subbands. An OFDMA system utilizes orthogonal frequency division multiplexing (OFDM), which effectively partitions the overall system bandwidth into a number of (N) orthogonal frequency subbands. These subbands are also referred to as tones, sub-carriers, bins, frequency channels, and so on. Each subband is associated with a respective sub-carrier that may be modulated with data. An OFDMA system may use any combination of time, frequency, and code division multiplexing.

For clarity, the layered reuse techniques are described below for an OFDMA system. In this OFDMA system, multiple orthogonal "traffic" channels may be defined whereby (1) each subband is used for only one traffic channel in any given time interval and (2) each traffic channel may be assigned zero, one, or multiple subbands in each time interval. A traffic channel may be viewed as a convenient way of expressing an assignment of subbands for different time intervals. Each terminal may be assigned a different traffic channel. For each sector, multiple data transmissions may be sent simultaneously on these traffic channels without interfering with one another.

The OFDMA system may or may not use frequency hopping (FH). With frequency hopping, a data transmission hops from subband to subband in a pseudo-random manner, which can provide frequency diversity and other benefits. For a frequency hopping OFDMA (FH-OFDMA) system, each traffic channel may be associated with a specific FH sequence that indicates the particular subband(s) to use for that traffic channel in each time interval (or hop period). The FH sequences for different traffic channels in each sector are orthogonal to one another so that no two traffic channels use the same subband in any given hop period. The FH sequences for each sector may also be pseudo-random with respect to the FH sequences for neighboring sectors. These properties for the FH sequences minimize intra-sector interference and randomize inter-sector interference.

In the OFDMA system, there may be a large variance in interference levels across the subbands, depending on the interfering entities in neighboring sectors. For example, terminal 120g in FIG. 1 is located at the coverage edge of its serving base station 110c, whereas terminal 120h is located closer to base station 120c. Terminal 120g is also closer to its neighboring base stations 110a and 110b than terminal 120h is to its neighboring base station 110d. Consequently, for the same transmit power per subband at terminals 120g and 120h, "sector-edge" terminal 120g causes more interference to its neighboring base stations 110a and 110b on the reverse link than "interior" terminal 120h to its neighboring base station 120d. The terminals communicating with base stations 110a and 110b would observe higher levels of inter-sector interference on the reverse link when their traffic channels "collide" with (or use the same subband as) the traffic channel for terminal 120g. Collision with strong interfering entities has a detrimental effect that is particularly significant to sector-edge terminals. For example, terminal 120b is located at the coverage edge of its serving base station 110a. The strong interference from terminal 120g in combination with the weak received signal power for terminal 120b may significantly degrade the performance of terminal 120b. The deleterious effect of inter-sector interference may be mitigated to an extent with frequency hopping and hybrid automatic retransmission (H-ARQ), which is continual transmission of additional redundancy information for each packet until the packet is decoded correctly. However, there may still be considerable loss in both system capacity and coverage due to a large variation in channel conditions for the users in the system.

The layered reuse techniques can combat the potentially large variation in inter-sector interference observed by strong (interior) users and weak (sector-edge) users. These techniques may be used for systems composed of unsectorized cells as well as systems composed of sectorized cells. For clarity, layered reuse is described below for an exemplary system composed of 3-sector cells and 3 subband sets.

Figure 2A:
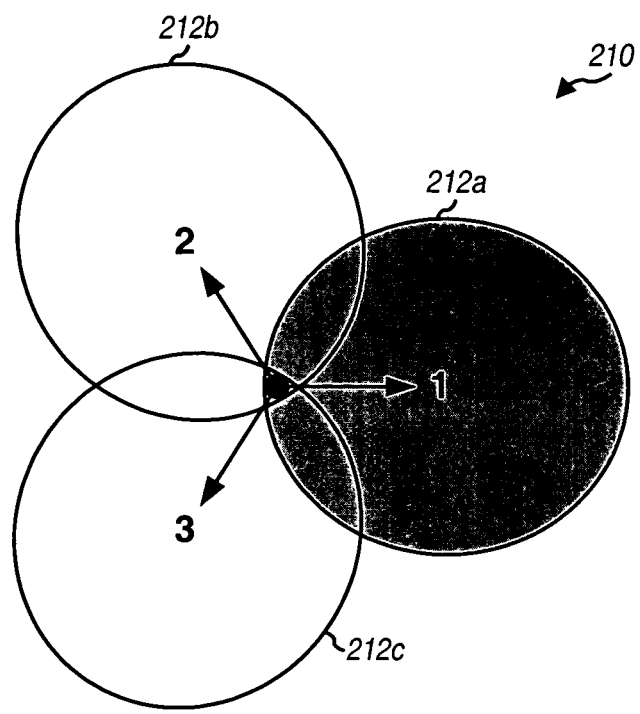
FIGS. 2A and 2B show a sectorized cell and its model, respectively.

FIG. 2A shows a cell 210 with three sectors. The coverage area of each base station may be of any size and shape and is typically dependent on various factors such as terrain, obstructions, and so on. The base station coverage area may be partitioned into three sectors 212*a*, 212*b*, and 212*c*, which are labeled as sectors 1, 2, and 3, respectively. Each sector may be defined by a respective (e.g., 65° horizontal) antenna beam pattern, and the three beam patterns for the three sectors may point 120° from each other. The size and shape of each sector is generally dependent on the antenna beam pattern for that sector. The sectors of the cell typically overlap at the edges, with the amount of overlap being determined by the antenna beam patterns, terrain, obstructions, and so on for these sectors. The cell/sector edge may be quite complex, and a cell/sector not even be a contiguous region.

Figure 2B:
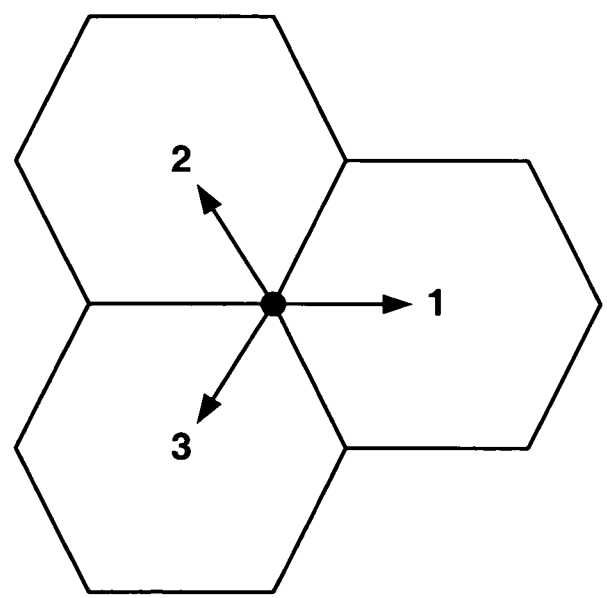

FIG. 2B shows a simple model for sectorized cell 210. Each of the three sectors in cell 210 is modeled by an ideal hexagon that approximates the boundary of the sector. The coverage area of each base station may be represented by a clover of three ideal hexagons centered at the base station.

Figure 3:
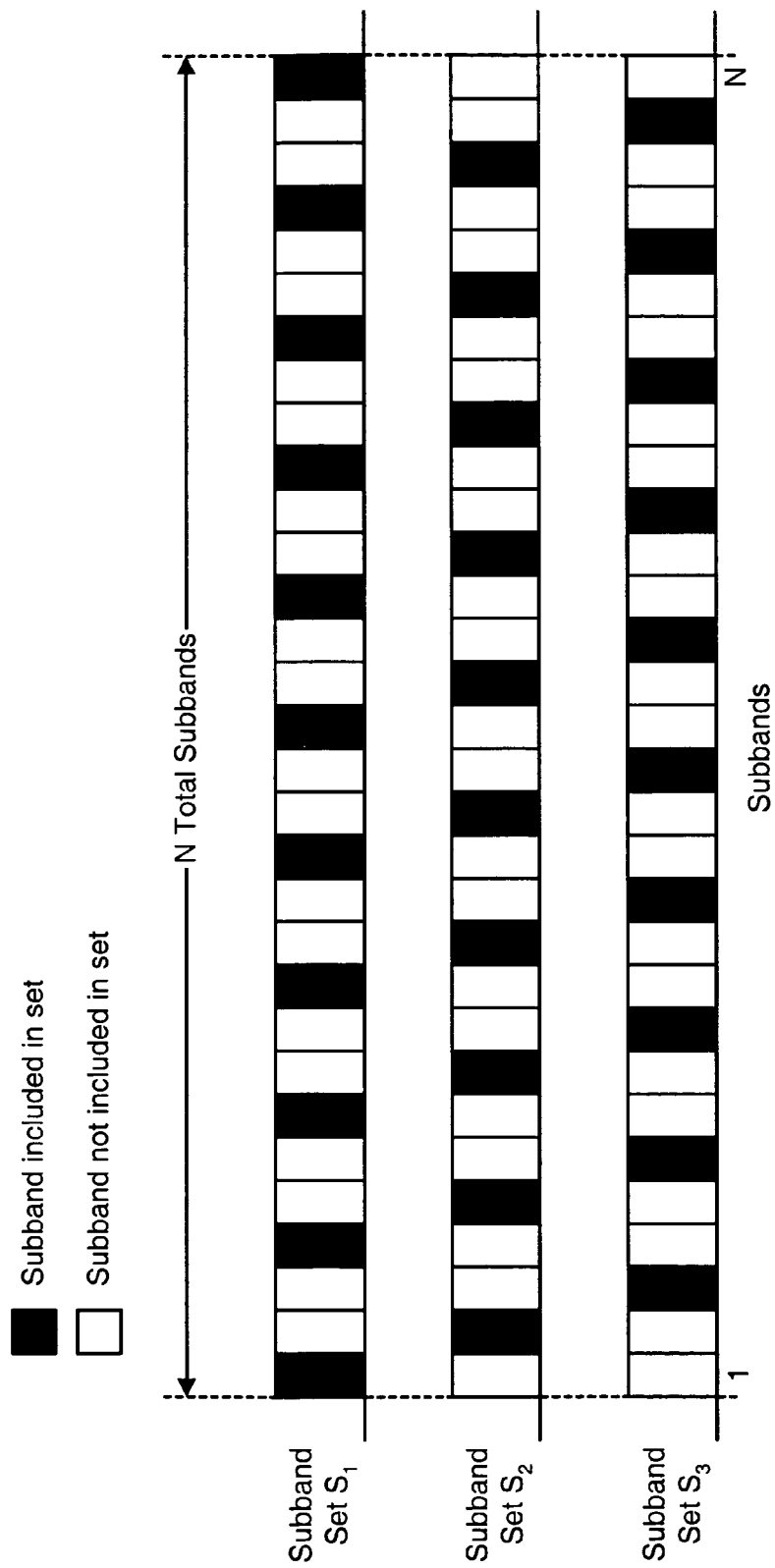
FIG. 3 shows a partitioning of N total subbands into three disjoint sets.

FIG. 3 shows a partitioning of the N total subbands in the system into three disjoint sets of subbands. The three sets are disjoint or non-overlapping in that each of the N subbands belongs to only one set, if at all. In general, each set may contain any number of subbands and any one of the N total subbands. To achieve frequency diversity, each set may contain subbands taken from across the N total subbands. The subbands in each set may be uniformly distributed across the N total subbands such that consecutive subbands in the set are equally spaced apart (e.g., by 3 subbands), as shown in FIG. 3. Alternatively, the subbands in each set may be non-uniformly (e.g., randomly) distributed across the N total subbands. This may be advantageous in that it may provide frequency diversity against channel fading. The subbands in each set may also be arranged in groups of a fixed size (e.g., groups of 4 subbands) such that consecutive groups of subbands in the set are equally spaced apart (e.g., by 3 subband groups).

The three subband sets are labeled as $S_1$, $S_2$, and $S_3$. For each 3-sector cell, subband set $S_1$ may be assigned to sector 1 of that cell, subband set $S_2$ may be assigned to sector 2, and subband set $S_3$ may be assigned to sector 3. Each sector x (where x=1, 2, or 3) would then be associated with two subband sets—an assigned subband set $S_x$ and an unassigned subband set $S_{ux}$. The unassigned subband set $S_{ux}$ may contain all of the subbands in the other two sets not assigned to sector x. For example, sector 1 is associated with an assigned subband set $S_1$ and an unassigned subband set $S_{u1}$ that contains all of the subbands in sets $S_2$ and $S_3$.

Figure 4:
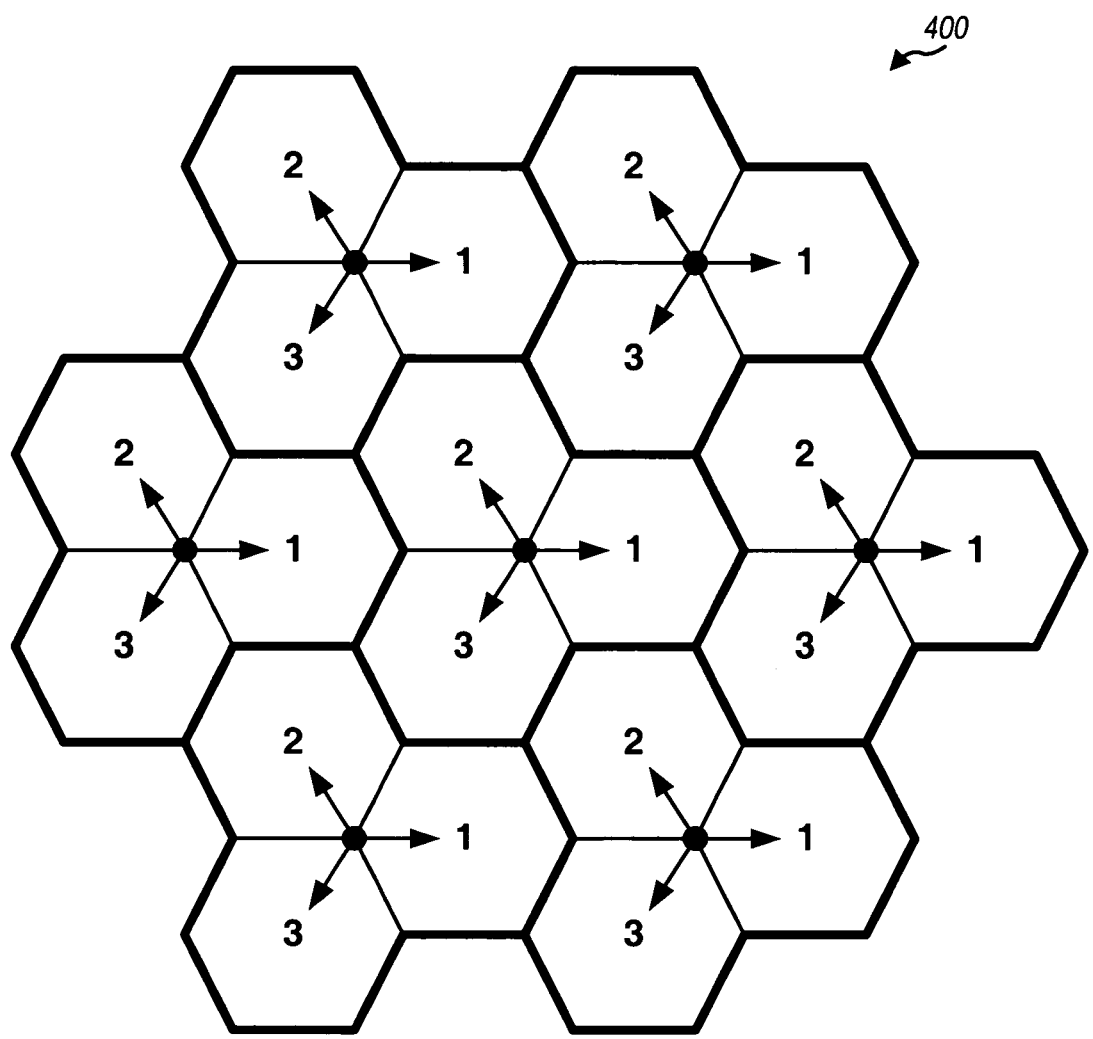
FIG. 4 shows an exemplary multi-cell layout with 3-sector cells.

FIG. 4 shows an exemplary multi-cell layout 400 with each 3-sector cell being modeled by a clover of three hexagons. Sector 1 for all cells in the layout are associated with an assigned subband set $S_1$ and an unassigned subband set $S_{u1}$. Sector 2 for all cells are associated with an assigned subband set $S_2$ and an unassigned subband set $S_{u2}$ that contains all of the subbands in sets $S_1$ and $S_3$. Sector 3 for all cells are associated with an assigned subband set $S_3$ and an unassigned subband set $S_{u3}$ that contains all of the subbands in sets $S_1$ and $S_2$.

For the exemplary layout shown in FIG. 4, each sector is surrounded by sectors that are labeled differently from that sector. Thus, each sector 1 is surrounded by sectors 2 and 3, each sector 2 is surrounded by sectors 1 and 3, and each sector 3 is surrounded by sectors 1 and 2. The assigned subband set for each sector is thus different from, and orthogonal to, the subband sets assigned to neighboring sectors.

Each sector may utilize its assigned and unassigned subband sets in various manners. For example, each sector may allocate subbands in the assigned and unassigned sets to users in the sector based on channel conditions. Different users may have different channel conditions and may have different contribution and tolerance to inter-sector interference. The subband allocation may be performed such that good performance may be achieved for all users in the sector and taking into account the following observations.

A key observation is that weak users typically cause the most inter-sector interference. A weak user has a relatively poor signal quality metric for its serving base station due to various factors such as antenna beam pattern, path loss, shadowing, and so on. Signal quality metric may be defined by a signal-to-interference-and-noise ratio (SINR), a signal-to-noise ratio (SNR), a carrier-to-interference ratio (C/I), channel gain, received pilot power, and/or some other quantity measured for the serving base station, some other measurements, or any combination thereof. A weak user may in general be located anywhere within a sector but is typically located far away from its serving base station. For simplicity, the following description assumes that signal quality is dependent on position in a sector, and a weak user is also called a sector-edge user.

Weak users usually require high transmit power on both the forward and reverse links to achieve a target level of performance or grade of service (GoS). In a well-designed system, sector-edge users should have a relatively fair signal quality metric for at least one neighboring base station, so that handoff may be performed from a current serving base station to the neighboring base station. On the reverse link, for a given user u, sector-edge users in neighboring sectors with relatively good signal quality metrics for the serving base station for user u are usually the dominant sources of interference to user u. On the forward link, the amount of interference on each subband is proportional to the amount of transmit power used by neighboring base stations for that subband. If higher transmit powers are used on the forward link for sector-edge users in neighboring sectors, then user u would observe higher levels of interference on subbands that collide with those used for the sector-edge users.

Another key observation is that weak users are typically a bottleneck in a system that imposes a fairness requirement or criterion. The fairness requirement may dictate the scheduling of users for data transmission and the allocation of system resources to users such that some minimum GoS is achieved for all users. Sector-edge users have high path losses that result in low received signal power for both the forward and reverse links. In addition, the interference level observed on the forward link is also high due to the closer distance to interfering base stations and may also be high on the reverse link due to sector-edge users in neighboring sectors. The combination of low received signal power and high interference level may require allocation of more system resources (e.g., more subbands and/or longer transmission time) to sector-edge users in order to satisfy the fairness requirement. System performance may be improved by more effectively serving the sector-edge users.

In a first layered reuse scheme, weak (sector-edge) users in each sector are allocated subbands in the assigned set, and strong (interior) users are allocated subbands in the unassigned set. The weak users in each sector are typically strong interferers to neighboring sectors and are also more vulnerable to high levels of interference from neighboring sectors. Because the assigned subband sets for neighboring sectors are orthogonal to one another, the weak users in each sector are orthogonal to strong interferers in neighboring sectors.

Layered reuse attempts to equalize the channel conditions for weak and strong users by allocating more interference to strong users and less interference to weak users. By controlling the distribution of inter-sector interference in this manner, performance is improved for weak users. Layered reuse can facilitate delivery of fair services to users with different channel conditions.

Figure 5:
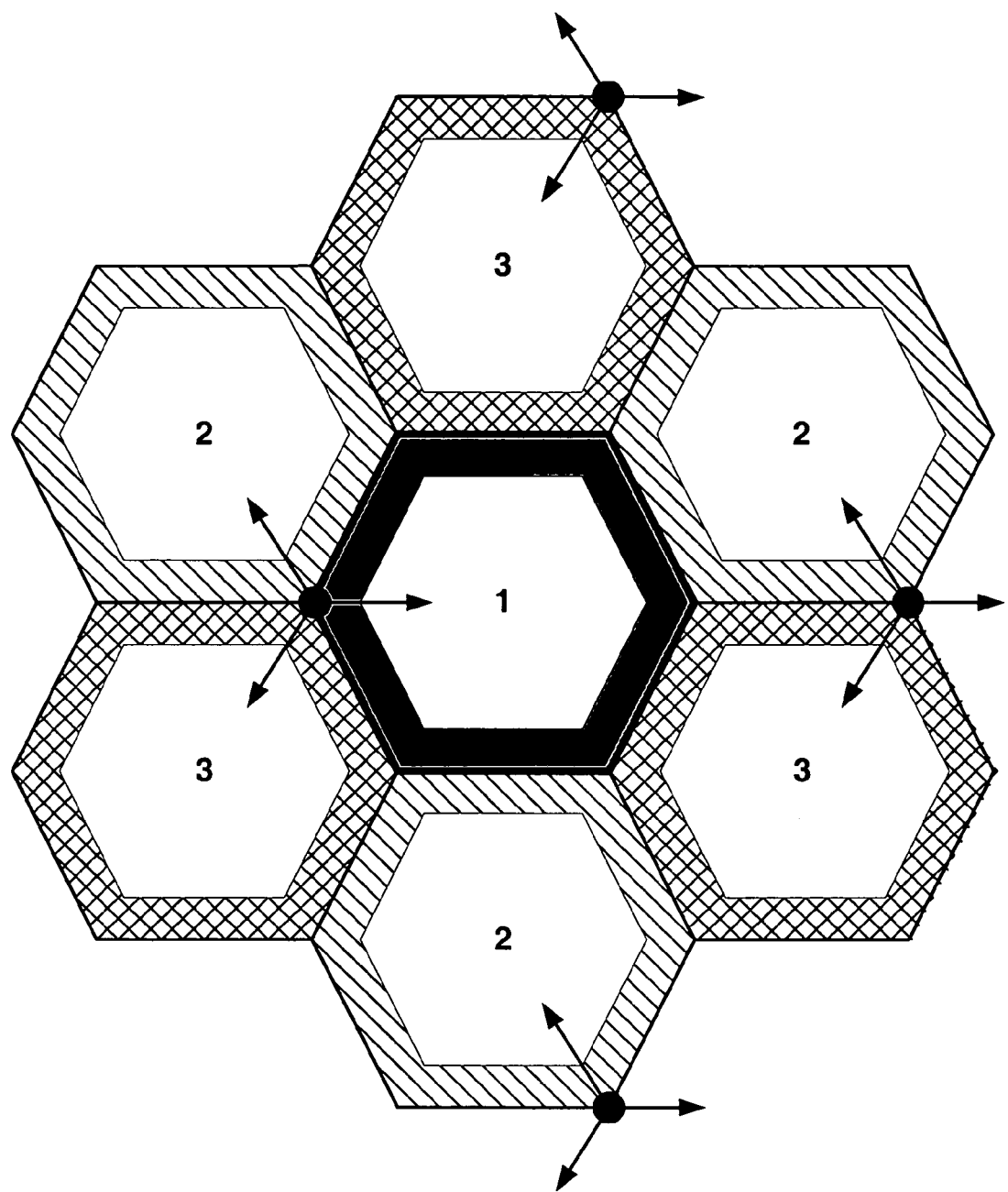
FIG. 5 shows a distribution of interference in a cluster of seven sectors.

FIG. 5 shows the distribution of sector-edge users in a cluster of seven sectors with the subband allocation described above. For simplicity of illustration, the sector-edge users in each sector are assumed to be located within a hexagonal ring that borders the boundary of the hexagon for that sector. The hexagonal ring for sector 1 is shown with shading, the hexagonal ring for sector 2 is shown with diagonal-hashing, and the hexagonal ring for sector 3 is shown with cross-hashing. For the layout shown in FIG. 5, sector 1 is surrounded by sectors 2 and 3 and not another sector 1. Consequently, the sector-edge users in sector 1 are orthogonal to, and do not interfere with, the sector-edge users in the six sectors 2 and 3 that surround this sector 1.

With the subband allocation as described above and illustrated in FIG. 5, the weak users in each sector may observe no interference from strong interferers in neighboring sectors. Consequently, the weak users in each sector may be able to achieve a better signal quality metric. The variation in SINRs for all users in the sector is reduced by improving the SINRs of weak users (via less inter-sector interference) while possibly degrading the SINRs of strong users. The strong users can still typically achieve good performance because of their better signal quality metrics. As a result, improved communication coverage as well as higher overall system capacity may both be achieved for the system.

Figure 6:
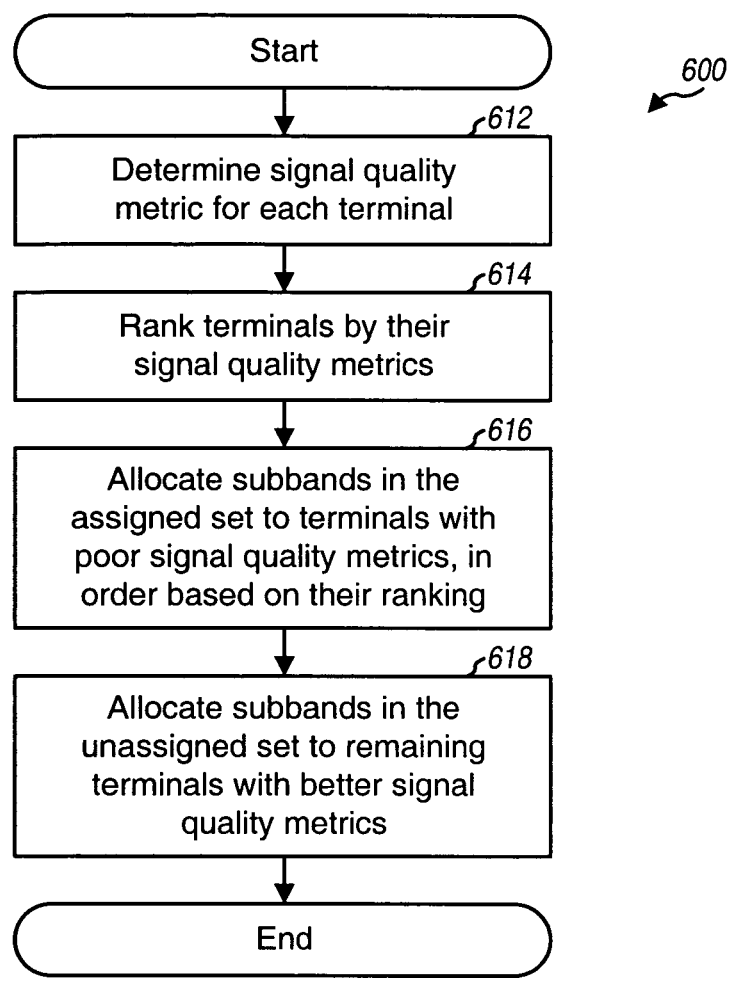
FIG. 6 shows a process to allocate subbands to users based on signal quality metric.

FIG. 6 shows a flow diagram of a process 600 for allocating subbands to users in a sector based on channel conditions. Process 600 may be performed by/for each sector. Initially, the signal quality metric for each user in the sector is determined (block 612). This may be achieved by measuring the received power for a pilot transmitted by each user on the reverse link. Alternatively, each user may determine its signal quality metric based on a pilot transmitted on the forward link by the sector and send back the signal quality metric to the sector. In any case, the sector obtains signal quality metrics for all users in the sector and ranks these users based on their signal quality metrics, e.g., in order from the weakest user with the worst signal quality metric to the strongest user with the best signal quality metric (block 614).

Subbands in the set assigned to the sector are then allocated to the users, e.g., in order based on their ranking, until all subbands in the assigned set are allocated (block 616). For example, the weakest user may be allocated subbands in the assigned set first, then the second weakest user may be allocated subbands in the assigned set next, and so on. Once the assigned set is empty, subbands in the unassigned set are then allocated to remaining users, e.g., in order based on their ranking (block 618). The subband allocation may be performed for one user at a time until all users have been allocated subbands or all subbands in both sets have been allocated. The process then terminates.

Process 600 may be performed by each sector in each scheduling interval, which may be a predetermined time interval. Each sector may then send signaling (e.g., to all users or to only users allocated different subbands) to indicate the subbands allocated to each user. Process 600 may also be performed (1) whenever there is a change in users in the sector (e.g., if a new user is added or a current user is removed), (2) whenever the channel conditions for the users change appreciably, or (3) at any time and/or due to any triggering criterion. At any given moment, all of the subbands may not be available for scheduling, e.g., some subbands may already be in use for H-ARQ retransmissions.

FIG. 6 shows allocation of subbands based on the signal quality metrics for the users. In general, any factor and any number of factors may be considered for subband allocation. Some factors that may be considered include the SINRs achieved by the users, the data rates supported by the users, the payload size, the type of data to be sent, the amount of delay already experienced by the users, outage probability, the maximum available transmit power, the type of data services being offered, and so on. These various factors may be given appropriate weights and used to prioritize the users. The users may then be allocated subbands based on their priority. The user with the highest priority may be allocated subbands in the assigned set first, then the user with the second highest priority, and so on. With priority-based ranking, a given user may be allocated subbands in different sets in different scheduling intervals if the relative priority of that user changes. For clarity, much of the description herein assumes the ranking of users based solely on channel conditions (e.g., signal quality metrics).

The subband allocation as described above also reduces the likelihood of observing interference for sector-edge users in a partially loaded system. The loading of each sector (denoted as $\rho$) is the percentage of full capacity being utilized by that sector. If each assigned set contains one third of the N total subbands and if users are allocated subbands in the assigned set first, then there is no inter-sector interference when the sector loading is $\rho < \frac{1}{3}$ and only the subbands in the assigned set are used by each sector. Without layered reuse, each user would observe interference from a neighboring sector one third of the time when the sector loading is $\rho = \frac{1}{3}$.

If the sector loading is $\frac{1}{3} < \rho < 1$, then all subbands in the assigned set are allocated, only a fraction of the subbands in the unassigned set are allocated, and only the allocated subbands in the unassigned set cause interference to sector-edge users in neighboring sectors. By using the assigned set first, the loading factor for the unassigned set (denoted as $\rho_u$) is reduced and may be given as: $\rho_u = (3\rho-1)/2$. The lower $\rho_u$ results in reduced likelihood of observing interference by sector-edge users in neighboring sectors. For example, if loading for each sector is $\rho = \frac{2}{3}$, then the loading factor for the unassigned set will be $\rho_u = \frac{1}{2}$. In this case, the strong users in each sector would observe interference from a neighboring sector 75% of the time, but the weak users in each sector would observe interference from a neighboring sector only 50% of the time. Without layered reuse, each user in each sector would observe interference from users in a neighboring sector 66.7% of the time. Layered reuse thus reduces the likelihood that weak users will observe interference in a partially loaded system.

Under certain operating conditions, a system may be interference limited, which is a phenomenon whereby the overall system capacity cannot be increased by adding more users or transmitting at higher power level. Partial loading may be used to reduce the interference level when the system is interference limited. Partial loading may be achieved, for example, by allowing each sector to use all subbands in the assigned set but only a fraction of the subbands in the unassigned set. Partial loading may be selectively performed, for example, when the observed interference level exceeds a predetermined threshold.

The layered reuse techniques can conveniently support handoff, which refers to the transfer of a user from a current serving base station to another base station that is deemed better. Handoff may be performed as needed to maintain good channel conditions for users on the edge of sector coverage. Some conventional systems (e.g., a TDMA system) support "hard" handoff whereby a user first breaks away from the current serving base station and then switches to a new serving base station. Hard handoff allows the user to achieve switched-cell diversity against path loss and shadowing at the cost of a brief interruption in communication. A CDMA system supports "soft" and "softer" handoffs, so that a user can simultaneously maintain communication with multiple cells (for soft handoff) or multiple sectors (for softer handoff). Soft and softer handoffs can provide additional mitigation against fast fading.

The layered reuse techniques can reduce interference for sector-edge users, which are good candidates for handoff, and can also support hard, soft, and softer handoffs. A sector-edge user u in sector x may be allocated subbands in the assigned set for sector x. This sector-edge user u may also communicate with a neighboring sector y via subbands in the assigned set for sector y. Since the assigned sets for sectors x and y are disjoint, user u may simultaneously communicate with both sectors x and y (and with minimal interference from strong interferers in both sectors) for soft or softer handoff. User u may also performed hard handoff from sector x to sector y. Since the assigned subband sets for sectors x and y are orthogonal to one another and are absent of strong interferers, the received SINR of user u may not change quite as abruptly when handed off from sector x to sector y, which can ensure a smooth handoff.

The layered reuse techniques may be used for both the forward and reverse links. On the reverse link, each terminal may transmit at full power regardless of the whether the terminal has been allocated subbands in the assigned or unassigned set. Referring back to FIG. 1, sector-edge terminal 120g causes more interference to base stations 110a and 110b. However, interior terminals 120a, 120c, and 120e have better signal quality metrics for these base stations and are better able to withstand the higher level of interference from terminal 120g.

On the forward link, each base station may transmit at full power for subbands in the assigned set and at reduced power for subbands in the unassigned set. For example, base station 110c may transmit (1) at full power to sector-edge terminal 120g to improve the received SINR of this terminal and (2) at reduced power to interior terminals 120f and 120h to reduce the amount of inter-sector interference. Terminals 120f and 120h may still be able to achieve high received SINRs, even with the reduced transmit power, because of their better signal quality metrics for base station 110c and the worse signal quality metrics for neighboring base stations. Reduced transmit power for the subbands in the unassigned set may be achieved by limiting the transmit power on these subbands to a predetermined power level and/or via use of power control.

In general, power control may or may not be used for data transmission on the forward and reverse links. Power control adjusts the transmit power for a data transmission such that the received SINR for the transmission is maintained at a target SINR, which may in turn be adjusted to achieved a particular level of performance, e.g., 1% packet error rate (PER). Power control may be used to adjust the amount of transmit power used for a given data rate, so that interference is minimized. For a system that employs power control for each user, allocating subbands in the assigned set to weak users and subbands in the unassigned set to strong users may automatically result in less transmit power being used for strong users.

Power control may also be used for certain transmissions and omitted for other transmissions. For example, power control may be used on the forward link for terminals allocated subbands in the unassigned set to reduce transmit power for these subbands. Power control may be omitted in cases where full transmit power may be more advantageous. For example, full transmit power may be used for a variable rate transmission (e.g., an H-ARQ transmission) to achieve the highest rate possible for a given channel condition.

In the above description, each sector is associated with one assigned subband set and one unassigned subband set, where the assigned subband sets for neighboring sectors are orthogonal to one another. Further improvement in interference control may be achieved by using more subband sets for each sector.

Figure 7:
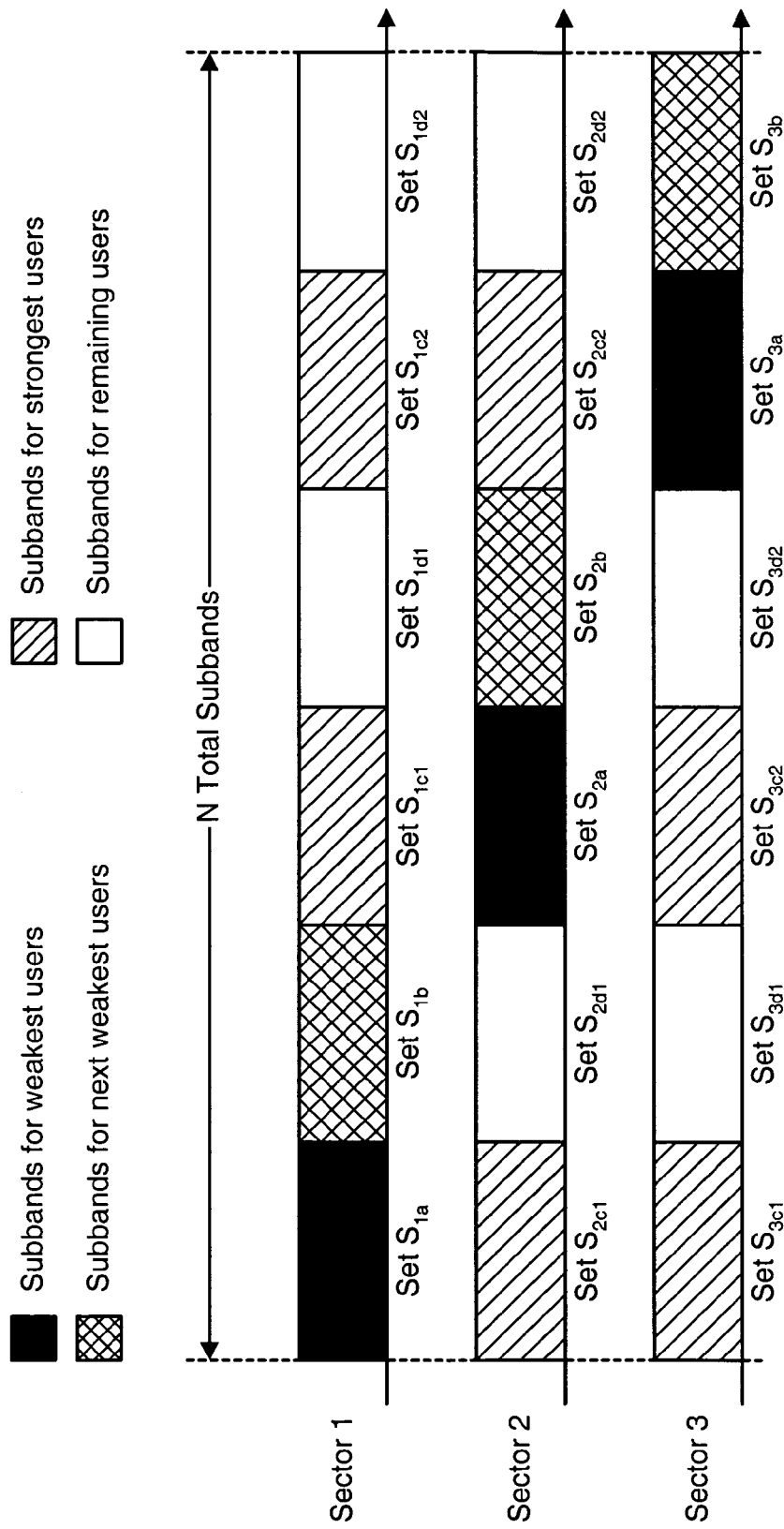
FIG. 7 shows an assignment of multiple subband sets to each sector.

FIG. 7 shows an exemplary assignment of multiple disjoint subband sets to each sector. In this example, each sector x (where x=1, 2, or 3) is assigned a set of subbands (labeled as $S_{xa}$) to use for the weakest users in the sector, a set of subbands (labeled as $S_{xb}$) to use for the next weakest users in the sector, two sets of subbands (denoted as $S_{xc1}$ and $S_{xc2}$) to use for the strongest users in the sector, and two sets of subbands (labeled as $S_{xd1}$ and $S_{xd2}$) to use for the remaining (or "medium") users in the sector. In general, each of the six sets may contain any number of subbands and any ones of the N total subbands in the system.

To minimize inter-sector interference for weak users, the subband sets $S_{xa}$ and $S_{xb}$ for neighboring sectors should be orthogonal to one another. This may be achieved by simply partitioning the assigned subband set $S_x$ for each sector into two sets. The two subband sets $S_{xc1}$ and $S_{xc2}$ for the strongest users in each sector x should also be the same as the subband sets $S_{ya}$ and $S_{za}$ used for the weakest users in neighboring sectors y and z, where x≠y≠z. The weakest users in each sector x would then observe interference from the strongest users (which are also typically the weakest interferers) in neighboring sectors y and z. The next weakest users in each sector x would observe interference from the next weakest interferers (or medium users) in neighboring sectors y and z.

Each sector may allocate subbands in its six sets to users in the sector, for example, similar to that described above for FIG. 6. Each sector may rank its users based on their signal quality metrics and may then allocate subbands to its users one at a time starting with the weakest user. The subbands in set $S_{xa}$ are allocated first until the set is exhausted, then the subbands in set $S_{xb}$ are allocated next until the set is exhausted, then the subbands in sets $S_{xd1}$ and $S_{xd2}$, and finally the subbands in sets $S_{xc1}$ and $S_{xc2}$.

For clarity, subband sets $S_{xc1}$ and $S_{xc2}$ for the strongest users are shown as two separate sets, and subband sets $S_{xd1}$ and $S_{xd2}$ for the medium users are also shown as two separate sets. To improve frequency diversity, a single set $S_{xc}$ may be formed with the subbands in sets $S_{xc1}$ and $S_{xc2}$, and a single set $S_{xd}$ may be formed with the subbands in sets $S_{xd1}$ and $S_{xd2}$. A strong user may then be allocated subbands in set $S_{xd}$, and a medium user may be allocated subbands in set $S_{xc}$.

The use of multiple assigned subband sets for each sector (e.g., as shown in FIG. 7) allows for better matching of weak users and strong interferers in different sectors, which may result in better equalization of the channel conditions for strong and weak users. In general, any number of orthogonal subband sets may be assigned to each sector. More subband sets allow for finer categorization of users based on their channel conditions and better matching of users with different channel conditions.

The subband sets may be defined in various manners. In one embodiment, the subband sets are defined based on global frequency planning for the system and remain static. Each sector is assigned the appropriate subband sets and thereafter uses these subband sets as described above. This embodiment simplifies implementation for layered reuse since each sector can act autonomously, and no signaling between neighboring sectors is required. In a second embodiment, the subband sets may be dynamically defined based on sector loading and possibly other factors. For example, the assigned subband set for each sector may be dependent on the number of weak users in the sector, which may change over time. A designated sector or a system entity (e.g., system controller 130) may receive loading information for various sectors, define the subband sets, and assign subband sets to the sectors. This embodiment may allow for better utilization of system resources based on the distribution of users. In yet another embodiment, the sectors may send inter-sector messages to negotiate subband sets and assign the subband sets to the sectors.

In a second layered reuse scheme, each sector is assigned multiple (L) sets of subbands and allocates subbands in these sets to users in the sector based on the sector loading. The L subband sets may be labeled $S_1$ through $S_L$. The sector would allocate the subbands in set $S_1$ first to users in the sector, then the subbands in set $S_2$, and so on, and then the subbands in set $S_L$. Different subband sets may be associated with different levels of orthogonality.

Figure 8:
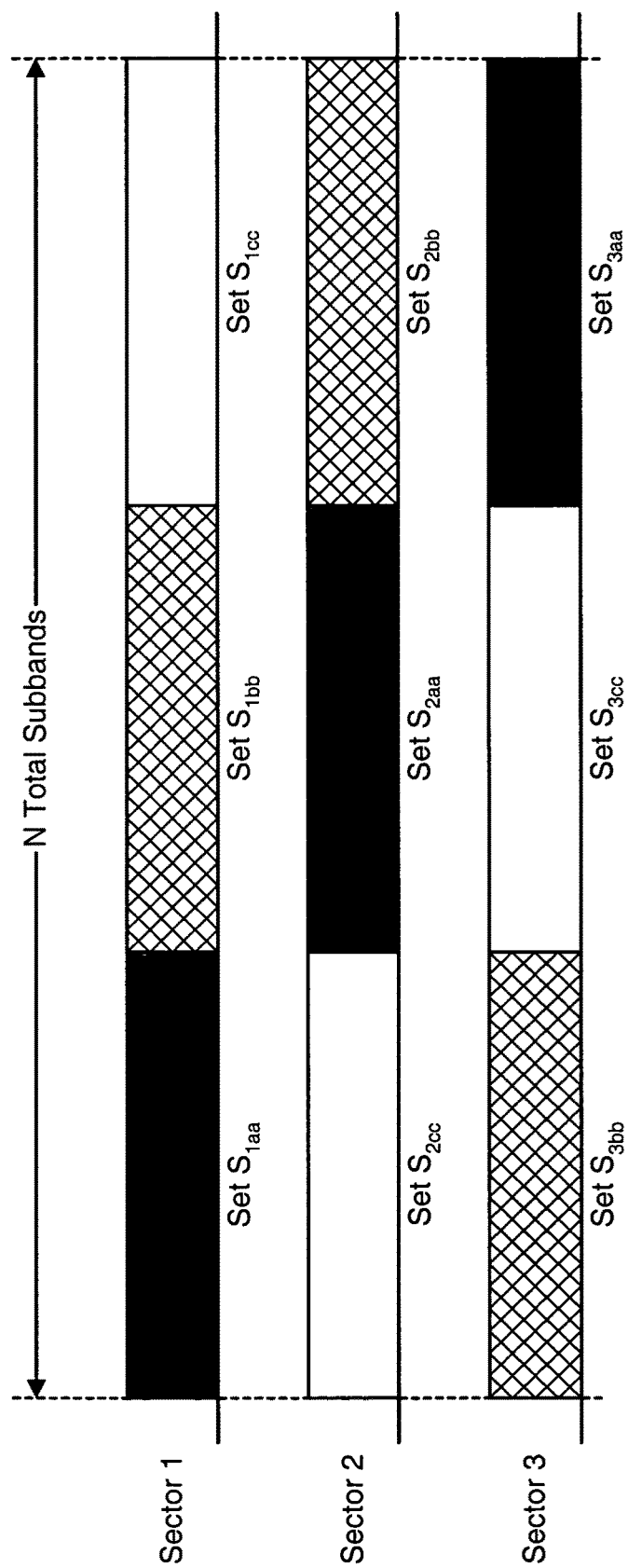
FIG. 8 shows an assignment of three subband sets to each sector.

FIG. 8 shows an assignment of subband sets to each sector for the second layered reuse scheme. In this example, each sector x (where x=1, 2, or 3) is assigned three sets of subbands, which are labeled as $S_{xaa}$, $S_{xbb}$, and $S_{xcc}$. Each sector allocates subbands in set $S_{xaa}$ first, then subbands in set $S_{xbb}$ next, and then subbands in set $S_{xcc}$ last. Subband sets $S_{1aa}$, $S_{2aa}$ and $S_{3aa}$ for sectors 1, 2 and 3 are orthogonal to one another.

The second layered reuse scheme can improve performance for a partially loaded system. For example, if the loading of each sector $\rho<\frac{1}{3}$, then only the subbands in set $S_{aa}$ are used by each sector, and no user observes any inter-sector interference. If the sector loading is $\frac{1}{3}<\rho<\frac{2}{3}$, then subband sets $S_{aa}$ and $S_{bb}$ are used by each sector. Subband set $S_{aa}$ has a loading factor of $\rho_{aa}=1$, and subband set $S_{bb}$ has a loading factor of $\rho_{bb}=(3\rho-1)$. Users allocated subbands in set $S_{1aa}$ in sector 1 observes (1) interference from users allocated subbands in set $S_{3bb}$ in neighboring sector 3 for $100 \cdot \rho_{bb}$ percent of the time and (2) no interference from users in neighboring sector 2 since subband set $S_{2cc}$ is not used.

If the sector loading is $\frac{2}{3}<\rho<1$, then all three subband sets $S_{aa}$, $S_{bb}$ and $S_{cc}$ are used by each sector. Subband set $S_{aa}$ has a loading factor of $\rho_{aa}=1$, subband set $S_{bb}$ has a loading factor of $\rho_{bb}=1$, and subband set $S_{cc}$ has a loading factor of $\rho_{cc}=(3\rho-2)$. Users allocated subbands in set $S_{aa}$ in sector 1 observes interference from (1) users allocated subbands in set $S_{3bb}$ in neighboring sector 3 for 100 percent of the time and (2) users allocated subbands in set $S_{2cc}$ in neighboring sector 2 for $100 \cdot \rho_{cc}$ percent of the time.

For the second layered reuse scheme, the users in each sector may also be ranked, for example, based on their signal quality metrics. The users may then be allocated subbands based on their ranking and from the sets in the predetermined order.

For clarity, the layered reuse techniques have been specifically described for a system with 3-sector cells. In general, these techniques may be used for any reuse pattern. For a K-sector/K-cell reuse pattern, the available system resources may be partitioned into M disjoint sets, where M may or may not be equal to K. Each sector/cell in the reuse pattern may be allocated one or more of the M subband sets. Each sector/cell may then use the assigned set(s) and unassigned set(s) as described above.

For clarity, the layered reuse techniques have been described for an OFDMA system. These techniques may also be used for systems that utilize FDM, TDM, CDM, some other orthogonal multiplexing technique, or a combination thereof. The system resources to be reused (e.g., frequency subbands/channels, time slots, and so on) are partitioned into disjoint sets, where each set contains a portion of the system resources. For example, the available time slots in the system may be partitioned into three sets, with each set containing different time slots than those in the other two sets. One set may be assigned to each sector, which may use the assigned sets for weak users and the unassigned sets for strong users.

As another example, the layered reuse techniques may be used for a Global System for Mobile Communications (GSM) system. A GSM system may operate in one or more frequency bands. Each frequency band covers a specific range of frequencies and is divided into a number of 200 kHz radio frequency (RF) channels. Each RF channel is identified by a specific ARFCN (absolute radio frequency channel number). For example, the GSM 900 frequency band covers ARFCNs 1 through 124, the GSM 1800 frequency band covers ARFCNs 512 through 885, and the GSM 1900 frequency band covers ARFCNs 512 through 810. Each GSM cell is assigned a set of RF channels and only transmits on the assigned RF channels. To reduce inter-cell interference, GSM cells located near each other are conventionally assigned different sets of RF channels such that the transmissions for neighboring cells do not interfere with one another. GSM typically employs a reuse factor greater than one (e.g., K=7).

Layered reuse may be used to improve efficiency and reduce inter-sector interference for the GSM system. The available RF channels for the GSM system may be partitioned into K sets (e.g., K=7), and each GSM cell may be assigned one of the K sets. Each GSM cell may then allocate RF channels in its assigned set to weak users in the cell and RF channels in the unassigned sets to strong users. The RF channels may thus be allocated a manner to distribute interference for weak and strong users to obtain the benefits described above. Each GSM cell may be allowed to use all of the available RF channels, and a reuse factor of one may be achieved with layered reuse.

The processing for data transmission and reception with layered reuse is dependent on system design. For clarity, exemplary transmitting and receiving entities in a frequency hopping OFDMA system for the first layered reuse scheme using assigned and unassigned subband sets are described below.

FIG. 9 shows a block diagram of an embodiment of a transmitting entity 110x, which may be the transmit portion of a base station or a terminal. Within transmitting entity 110x, an encoder/modulator 914 receives traffic/packet data from a data source 912 for a given user u, processes (e.g., encodes, interleaves, and modulates) the data based on a coding and modulation scheme selected for user u, and provides data symbols, which are modulation symbols for data. Each modulation symbol is a complex value for a point in a signal constellation for the selected modulation scheme. A symbol-to-subband mapping unit 916 provides the data symbols for user u onto the proper subbands determined by an FH control, which is generated by an FH generator 940 based on the traffic channel assigned to user u. Mapping unit 916 also provides pilot symbols on subbands used for pilot transmission and a signal value of zero for each subband not used for pilot or data transmission. For each OFDM symbol period, mapping unit 916 provides N transmit symbols for the N total subbands, where each transmit symbol may be a data symbol, a pilot symbol, or a zero-signal value.

An OFDM modulator 920 receives N transmit symbols for each OFDM symbol period and generates a corresponding OFDM symbol. OFDM modulator 920 typically includes an inverse fast Fourier transform (IFFT) unit and a cyclic prefix generator. For each OFDM symbol period, the IFFT unit transforms the N transmit symbols to the time domain using an N-point inverse FFT to obtain a "transformed" symbol that contains N time-domain chips. Each chip is a complex value to be transmitted in one chip period. The cyclic prefix generator then repeats a portion of each transformed symbol to form an OFDM symbol that contains N+C chips, where C is the number of chips being repeated. The repeated portion is often called a cyclic prefix and is used to combat inter-symbol interference (ISI) caused by frequency selective fading. An OFDM symbol period corresponds to the duration of one OFDM symbol, which is N+C chip periods. OFDM modulator 920 provides a stream of OFDM symbols. A transmitter unit (TMTR) 922 processes (e.g., converts to analog, filters, amplifies, and frequency upconverts) the OFDM symbol stream to generate a modulated signal, which is transmitted from an antenna 924a.

Controller 930 directs the operation at transmitting entity 110x. Memory unit 932 provides storage for program codes and data used by controller 930.

FIG. 10 shows a block diagram of an embodiment of a receiving entity 120x, which may be the receive portion of a base station or a terminal. One or more modulated signals transmitted by one or more transmitting entities are received by an antenna 1012, and the received signal is provided to and processed by a receiver unit (RCVR) 1014 to obtain samples. The set of samples for one OFDM symbol period represents one received OFDM symbol. An OFDM demodulator (Demod) 1016 processes the samples and provides received symbols, which are noisy estimates of the transmit symbols sent by the transmitting entities. OFDM demodulator 1016 typically includes a cyclic prefix removal unit and an FFT unit. The cyclic prefix removal unit removes the cyclic prefix in each received OFDM symbol to obtain a received transformed symbol. The FFT unit transforms each received transformed symbol to the frequency domain with an N-point FFT to obtain N received symbols for the N subbands. A subband-to-symbol demapping unit 1018 obtains the N received symbols for each OFDM symbol period and provides received symbols for the subbands assigned to user u. These subbands are determined by an FH control generated by an FH generator 1040 based on the traffic channel assigned to user u. A demodulator/decoder 1020 processes (e.g., demodulates, deinterleaves, and decodes) the received symbols for user u and provides decoded data to a data sink 1022 for storage.

A controller 1030 directs the operation at receiving entity 120x. A memory unit 1032 provides storage for program codes and data used by controller 1030.

For layered reuse, each sector (or a scheduler in the system) selects users for data transmission, determines the signal quality metrics and/or priority for the selected users, ranks these users, and allocates subbands or assigns traffic channels to the selected users. Each sector then provides each user with its assigned traffic channel, e.g., via over-the-air signaling. The transmitting and receiving entities for each user then performs the appropriate processing to transmit and receive data on the subbands indicated by the assigned traffic channel.

FIG. 11 shows a block diagram of an embodiment of FH generator 940 at transmitting entity 110x. The assigned traffic channel for user u is provided to a look-up table 1112a for the assigned set and a look-up table 1112b for the unassigned set. Each look-up table 1112 provides information indicating which subband(s) to use for data transmission in each time interval based on a subband mapping defined for its subband set. A selector 1114 receives the outputs from look-up tables 1112a and 1112b, selects the output of either look-up table 1112a or 1112b based on a subband set select input, and provides the selected output as the FH control. FH generator 940 may also be implemented with other designs, e.g., with pseudo-random number (PN) generators instead of look-up tables. FH generator 1040 at receiving entity 120x may also be implemented in the same manner as FH generator 940.

The layered reuse techniques described herein may be implemented by various means. For example, these techniques may be implemented in hardware, software, or a combination thereof. For a hardware implementation, the processing units used to allocate subbands, process data for transmission or reception, and perform other functions related to layered reuse may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the layered reuse techniques may be implemented with modules (e.g., procedures, functions, and so on) that perform the functions described herein. The software codes may be stored in a memory unit (e.g., memory unit 932 in FIG. 9 or memory unit 1032 in FIG. 10) and executed by a processor (e.g., controller 930 in FIG. 9 or 1030 in FIG. 10). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of allocating system resources in a communication system, comprising:

ranking a plurality of terminals in communication with a first sector of a current base station based, at least in part, on signal quality metrics achieved by the plurality of terminals for the current base station, wherein the first sector of the current base station is adjacent to at least one neighboring sector of at least one neighboring base station;

identifying, from the ranking, a set of low-ranked terminals;

allocating available system resources to the plurality of terminals based on the ranking of the plurality of terminals, wherein the available system resources comprise a first set of system resources that is orthogonal to at least a second set of system resources and orthogonal to a third set of system resources, the first set of system resources comprising a set of system resources assigned to the first sector of the current base station, the second set of system resources comprising a set of system resources assigned to the at least one neighboring sector of the at least one neighboring base station, and the third set of system resources comprising additional system resources not in the first set of system resources, wherein the third set of system resources overlap with a fourth set of system resources and overlap with the second set of system resources, the fourth set of system resources comprising at least one set of system resources assigned to a second sector of the current base station, wherein at least a portion of the third set of system resources is allocated to at least one of the plurality of terminals in communication with the first sector of the current base station, and wherein the allocating allocates some or all of the first set of system resources to the set of low-ranked terminals based on the identifying to reduce inter-sector interference at the set of low-ranked terminals.

2. The method of claim 1, wherein the signal quality metrics are indicative of received signal-to-interference-and-noise ratios (SINRs) achieved by the plurality of terminals for the current base station.

3. The method of claim 1, wherein the signal quality metrics are indicative of channel gains between the plurality of terminals and the current base station.

4. The method of claim 1, wherein the plurality of terminals are ranked based, at least in part, on priority determined for the plurality of terminals.

5. The method of claim 1, wherein the first sector of the current base station is assigned a first set of frequency subbands that is orthogonal to a second set of frequency subbands, the second set of frequency subbands comprising at least one set of frequency subbands assigned to the at least one neighboring sector of the at least one neighboring base station, and wherein the available system resources comprise the first set of frequency subbands and a third set of frequency subbands comprising additional frequency subbands not in the first set of frequency subbands.

6. The method of claim 5, wherein the first set of frequency subbands comprises one third of all frequency subbands available for data transmission in the communication system.

7. The method of claim 5, wherein the first set of frequency subbands has a first transmit power limit, and wherein the third set of frequency subbands have a second transmit power limit that is lower than the first transmit power limit.

8. The method of claim 5, wherein the plurality of terminals are allocated frequency subbands in order based on the ranking, and wherein the plurality of terminals are first allocated the frequency subbands in the first set of frequency subbands and then the third set of frequency subbands.

9. The method of claim 5, wherein the set of low-ranked terminals are allocated frequency subbands in the first set of frequency subbands and terminals with better signal quality metrics are allocated the third set of frequency subbands.

10. The method of claim 1, wherein the available system resources allocated to the plurality of terminals are used for data transmission on a reverse link.

11. The method of claim 1, wherein the available system resources allocated to the plurality of terminals are used for data transmission on a forward link.

12. The method of claim 1, wherein full transmit power is usable for data transmissions sent using the available system resources in the first set of system resources and reduced transmit power is usable for data transmissions sent using the third set of system resources.

13. The method of claim 1, wherein the available system resources comprise a plurality of radio frequency (RF) channels, and wherein the first sector of the current base station is assigned a set of RF channels that is orthogonal to at least one set of RF channels assigned to the at least one neighboring sector of the at least one neighboring base station.

14. The method of claim 1, wherein the available system resources comprise time slots, and wherein the first sector of the current base station is assigned time slots that are orthogonal to time slots assigned to the at least one neighboring sector of the at least one neighboring base station.

15. The method of claim 1, wherein the communication system utilizes orthogonal frequency division multiplexing (OFDM), and wherein the available system resources comprise a plurality of frequency subbands.

16. The method of claim 15, wherein the communication system is an orthogonal frequency division multiple access (OFDMA) system.

17. The method of claim 16, wherein the OFDMA system utilizes frequency hopping, and wherein each of the plurality of terminals is allocated different subbands in different time intervals.

18. The method of claim 1, wherein the plurality of terminals in communication with the first sector of the current base station transmit a message to the current base station indicative of their signal quality.

19. The method of claim 1, wherein the current base station transmits a resource allocation message to the plurality of terminals in communication with the first sector of the current base station.

20. The method of claim 1, wherein the first set of system resources and the third set of system resources are used to facilitate a handoff for at least one of the plurality of terminals.

21. The method of claim 1, wherein the signal quality metrics are indicative of inter-cell interference for the first sector of the current base station.

22. A method of allocating frequency subbands in a wireless communication system utilizing orthogonal frequency division multiplexing (OFDM), comprising:

ranking a plurality of terminals in communication with a first sector of a current base station based, at least in part, on signal quality metrics achieved by the plurality of terminals for the current base station, wherein the first sector of the current base station is adjacent to at least one neighboring sector of at least one neighboring base station; and allocating available frequency subbands to the plurality of terminals based on the signal quality metrics, wherein the available frequency subbands comprise a first set of frequency subbands assigned to the current base station that is orthogonal to at least a second set of frequency subbands and orthogonal to a third set of frequency subbands, the second set of frequency subbands comprising frequency subbands assigned to the at least one neighboring sector of the at least one neighboring base station, and the third set of system resources comprising frequency subbands not in the first set of frequency subbands, wherein the third set of frequency subbands overlap with a fourth set of frequency subbands and overlap with the second set of frequency subbands, the fourth set of frequency subbands comprising at least one set of frequency subbands assigned to a second sector of the current base station, and wherein terminals with poor signal quality metrics are allocated the first set of frequency subbands and terminals with better signal quality metrics are allocated the third set of frequency subbands.

23. An apparatus for allocating system resources in a communication system, comprising:
a controller;
memory in electronic communication with the controller, and
instructions stored in the memory, the instructions being executable by the controller to:
rank a plurality of terminals in communication with a first sector of a current base station based, at least in part, on signal quality metrics achieved by the plurality of terminals for the current base station, wherein the first sector of the current base station is adjacent to at least one neighboring sector of at least one neighboring base station;
identify, from the ranking, a set of low-ranked terminals;
allocate available system resources to the plurality of terminals based on the ranking of the plurality of terminals, wherein the available system resources comprise a first set of system resources that is orthogonal to at least a second set of system resources and orthogonal to a third set of system resources, the first set of system resources comprising a set of system resources assigned to the first sector of the current base station, the second set of system resources comprising a set of system resources assigned to the at least one neighboring sector of the at least one neighboring base station, and the third set of system resources comprising additional system resources not in the first set of system resources, wherein the third set of system resources overlap with a fourth set of system resources and overlap with the second set of system resources, the fourth set of system resources comprising at least one set of system resources assigned to a second sector of the current base station, wherein at least a portion of the third set of system resources is allocated to at least one of the plurality of terminals in communication with the first sector of the current base station;
allocate some or all of the first set of system resources to the set of low-ranked terminals based on the identification to reduce inter-sector interference at the set of low-ranked terminals; and
store the first set of system resources and the second set of system resources.

24. The apparatus of claim 23, wherein the first sector of the current base station is assigned a first set of frequency subbands that is orthogonal to a second set of frequency subbands, the second set of frequency subbands comprising at least one set of frequency subbands assigned to the at least one neighboring sector of the at least one neighboring base station, and wherein the available system resources comprise the first set of frequency subbands and a third set of frequency subbands comprising additional frequency subbands not in the first set of frequency subbands.

25. The apparatus of claim 24 wherein the set of low-ranked terminals are allocated frequency subbands in the first set of frequency subbands and terminals with better signal quality metrics are allocated the third set of frequency subbands.

26. The apparatus of claim 24, wherein the first set of frequency subbands has a first transmit power limit, and wherein the third set of frequency subbands have a second transmit power limit that is lower than the first transmit power limit.

27. An apparatus for allocating system resources in a communication system, comprising:
means for ranking a plurality of terminals in communication with a first sector of a current base station based, at least in part, on signal quality metrics achieved by the plurality of terminals for the current base station, wherein the first sector of the current base station is adjacent to at least one neighboring sector of at least one neighboring base station; and
means for identifying, from the ranking, a set of low-ranked terminals;
means for allocating available system resources to the plurality of terminals based on the ranking of the plurality of terminals, wherein the available system resources comprise a first set of system resources that is orthogonal to at least a second set of system resources and orthogonal to a third set of system resources, the first set of system resources comprising a set of system resources assigned to the first sector of the current base station, the second set of system resources comprising a set of system resources assigned to the at least one neighboring sector of the at least one neighboring base station, and the third set of system resources comprising additional system resources not in the first set of system resources, wherein the third set of system resources overlap with a fourth set of system resources and overlap with the second set of system resources, the fourth set of system resources comprising at least one set of system resources assigned to a second sector of the current base station, wherein at least a portion of the third set of system resources is allocated to at least one of the plurality of terminals in communication with the first sector of the current base station, and wherein the means for allocating allocates some or all of the first set of system resources to the set of low-ranked terminals based on the identifying to reduce inter-sector interference at the set of low-ranked terminals.

28. The apparatus of claim 27, wherein the first sector of the current base station is assigned a first set of frequency subbands that is orthogonal to a second set of frequency subbands, the second set of frequency subbands comprising at least one set of frequency subbands assigned to the at least one neighboring sector of the at least one neighboring base station, and wherein the available system resources comprise the first set of frequency subbands and a third set of frequency subbands comprising additional frequency subbands not in the first set of frequency subbands.

29. The apparatus of claim 28, wherein the set of low-ranked terminals are allocated frequency subbands in the first set of frequency subbands and terminals with better signal quality metrics are allocated the third set of frequency subbands.

30. A method of processing data in a communication system, comprising:
   obtaining an allocation of system resources for a terminal, wherein the terminal and at least one other terminal in communication with a first sector of a current base station are ranked based, at least in part, on signal quality metrics achieved by the terminals for the current base station and allocated available system resources based on the ranking of the terminals, wherein the first sector of the current base station is assigned a first set of system resources that is orthogonal to a second set of system resources comprising at least one set of assigned system resources allocated to at least one neighboring sector of at least one neighboring base station of the current base station, wherein the at least one neighboring sector is adjacent to the first sector of the current base station, and wherein the available system resources include the first set of system resources and a third set of system resources comprising system resources not in the first set of system resources, wherein the third set of system resources overlap with a fourth set of system resources and overlap with the second set of system resources, the fourth set of system resources comprising at least one set of system resources assigned to a second sector of the current base station, wherein at least a portion of the third set of system resources is allocated to at least one of the terminals in communication with the first sector of the current base station, and wherein the allocation of system resources for the terminal includes one or more resources from the first set of system resources based on whether the terminal is identified as being among a set of low-ranked terminals from the ranking to reduce inter-sector interference at the set of low-ranked terminals; and
   generating a control indicative of the system resources allocated to the terminal.

31. The method of claim 30, further comprising:
   receiving a data transmission sent using the system resources allocated to the terminal; and
   processing the received data transmission in accordance with the control.

32. The method of claim 30, further comprising:
   processing data for transmission in accordance with the control; and
   sending a data transmission using the system resources allocated to the terminal.

33. The method of claim 32, wherein the data transmission is sent at full transmit power if the terminal is allocated system resources in the first set of system resources and sent at reduced transmit power if the terminal is allocated system resources not in the first set of system resources.

34. The method of claim 30, wherein the communication system utilizes orthogonal frequency division multiplexing (OFDM), and wherein the system resources comprise a plurality of frequency subbands.

35. The method of claim 34, wherein the communication system utilizes frequency hopping, and wherein the control indicates different subbands to use for data transmission in different time intervals.

36. An apparatus in a communication system, comprising:
   a controller operative to obtain an allocation of system resources for a terminal, wherein the terminal and at least one other terminal in communication with a first sector of a current base station are ranked based, at least in part, on signal quality metrics achieved by the terminals for the current base station and allocated available system resources based on the ranking of the terminals, wherein the first sector of the current base station is assigned a first set of system resources that is orthogonal to a second set of system resources comprising at least one set of assigned system resources allocated to at least one neighboring sector of at least one neighboring base station of the current base station, wherein the at least one neighboring sector is adjacent to the first sector of the current base station, and wherein the available system resources include the first set of system resources and a third set of system resources comprising system resources not in the first set of system resources, wherein the third set of system resources overlap with a fourth set of system resources and overlap with the second set of system resources, the fourth set of system resources comprising at least one set of system resources assigned to a second sector of the current base station, wherein at least a portion of the third set of system resources is allocated to at least one of the terminals in communication with the first sector of the current base station, and wherein the allocation of system resources for the terminal includes one or more resources from the first set of system resources based on whether the terminal is identified as being among a set of low-ranked terminals from the ranking to reduce inter-sector interference at the set of low-ranked terminals; and
   a generator operative to generate a control indicative of the system resources allocated to the terminal.

37. The apparatus of claim 36, further comprising:
   a demodulator operative to receive a data transmission sent using the system resources allocated to the terminal; and
   a processing unit operative to process the received data transmission in accordance with the control.

38. The apparatus of claim 36, further comprising:
   a processing unit operative to process data for transmission in accordance with the control; and
   a modulator operative to send a data transmission using the system resources allocated to the terminal.

39. An apparatus in a communication system, comprising:
   means for obtaining an allocation of system resources for a terminal, wherein the terminal and at least one other terminal in communication with a first sector of a current base station are ranked based, at least in part, on signal quality metrics achieved by the terminals for the current base station and allocated available system resources based on the ranking of the terminals, wherein the first sector of the current base station is assigned a first set of system resources that is orthogonal to a second set of system resources comprising at least one set of assigned system resources allocated to at least one neighboring sector of at least one neighboring base station of the current base station, wherein the at least one neighboring sector is adjacent to the first sector of the current base station, and wherein the available system resources include the first set of system resources and a third set of system resources comprising system resources not in the first set of system resources, wherein the third set of system resources overlap with a fourth set of system resources and overlap with the second set of system resources, the fourth set of system resources comprising at least one set of system resources assigned to a second sector of the current base station, wherein at least a portion of the third set of system resources is allocated to at least one of the terminals in communication with the first sector of the current base station, and wherein the allocation of system resources for the terminal includes one or more resources from the first set of system resources based on whether the terminal is identified as being among a set of low-ranked terminals from the ranking to reduce inter-sector interference at the set of low-ranked terminals; and means for generating a control indicative of the system resources allocated to the terminal.

40. The apparatus of claim 39, further comprising:
means for receiving a data transmission sent using the system resources allocated to the terminal; and
means for processing the received data transmission in accordance with the control.

41. The apparatus of claim 39, further comprising:
means for processing data for transmission in accordance with the control; and
means for sending a data transmission using the system resources allocated to the terminal.

42. A non-transitory program storage medium having computer executable instructions stored thereon, which when executed causes an apparatus to:
rank a plurality of terminals in communication with a first sector of a current base station based, at least in part, on signal quality metrics achieved by the plurality of terminals for the current base station, wherein the first sector of the current base station is adjacent to at least one neighboring sector of at least one neighboring base station;
identify, from the ranking, a set of low-ranked terminals;
allocate available system resources to the plurality of terminals based on the ranking of the plurality of terminals, wherein the available system resources comprise a first set of system resources that is orthogonal to at least a second set of system resources and orthogonal to a third set of system resources, the first set of system resources comprising a set of system resources assigned to the first sector of the current base station, the second set of system resources comprising a set of system resources assigned to the at least one neighboring sector of the at least one neighboring base station, and the third set of system resources comprising additional system resources not in the first set of system resources, and wherein the third set of system resources overlap with a fourth set of system resources and overlap with the second set of system resources, the fourth set of system resources comprising at least one set of system resources assigned to a second sector of the current base station, wherein at least a portion of the third set of system resources is allocated to at least one of the plurality of terminals in communication with the first sector of the current base station,
and wherein the allocation of the available system resources includes some or all of the first set of system resources being allocated to the set of low-ranked terminals based on the identification to reduce inter-sector interference at the set of low-ranked terminals.

43. A non-transitory program storage medium having computer executable instructions stored thereon, which when executed causes an apparatus to:
rank a plurality of terminals in communication with a first sector of a current base station based, at least in part, on signal quality metrics achieved by the plurality of terminals for the current base station, wherein the first sector of the current base station is adjacent to at least one neighboring sector of at least one neighboring base station; and allocate available frequency subbands to the plurality of terminals based on the signal quality metrics, wherein the available frequency subbands comprise a first set of frequency subbands assigned to the current base station that is orthogonal to at least a second set of frequency subbands and orthogonal to a third set of frequency subbands, the second set of frequency subbands comprising frequency subbands assigned to the at least one neighboring sector of the at least one neighboring base station, and the third set of system resources comprising frequency subbands not in the first set of frequency subbands, wherein the third set of frequency subbands overlap with a fourth set of frequency subbands and overlap with the second set of frequency subbands, the fourth set of frequency subbands comprising at least one set of frequency subbands assigned to a second sector of the current base station, and wherein terminals with poor signal quality metrics are allocated the first set of frequency subbands and terminals with better signal quality metrics are allocated the third set of frequency subbands.

44. A non-transitory program storage medium having computer executable instructions stored thereon, which when executed causes an apparatus to:
obtain an allocation of system resources for a terminal, wherein the terminal and at least one other terminal in communication with a first sector of a current base station are ranked based, at least in part, on signal quality metrics achieved by the terminals for the current base station and allocated available system resources based on the ranking of the terminals, wherein the first sector of the current base station is assigned a first set of system resources that is orthogonal to a second set of system resources comprising at least one set of assigned system resources allocated to at least one neighboring sector of at least one neighboring base station of the current base station, wherein the at least one neighboring sector is adjacent to the first sector of the current base station, and wherein the available system resources include the first set of system resources and a third set of system resources comprising system resources not in the first set of system resources, wherein the third set of system resources overlap with a fourth set of system resources and overlap with the second set of system resources, the fourth set of system resources comprising at least one set of system resources assigned to a second sector of the current base station, wherein at least a portion of the third set of system resources is allocated to at least one of the terminals in communication with the first sector of the current base station, and wherein the allocation of system resources for the terminal includes one or more resources from the first set of system resources based on whether the terminal is identified as being among a set of low-ranked terminals from the ranking to reduce inter-sector interference at the set of low-ranked terminals; and
generate a control indicative of the system resources allocated to the terminal.

* * * * *